J. FOWLER, Jr., & W. WORBY.

Steam-Plow.

No. {1,806, 32,810.}　　　　　　　　　　　　　Patented July 9, 1861.

UNITED STATES PATENT OFFICE.

JOHN FOWLER, JR., HAVERING, COUNTY OF MIDDLESEX, AND WM. WORBY, OF IPSWICH, COUNTY OF SUFFOLK, ENGLAND, ASSIGNORS TO WM. PENN TATHAM, OF PHILADELPHIA, PENNSYLVANIA.

IMPROVEMENT IN MACHINES FOR TILLING LAND BY STEAM.

Specification forming part of Letters Patent No. 32,810, dated July 9, 1861.

*To all whom it may concern:*

Be it known that we, JOHN FOWLER, Jr., of Havering, in the county of Middlesex, England, and WILLIAM WORBY, of Ipswich, in the county of Suffolk, England, have invented certain new and useful Improvements in Machinery for Plowing and Tilling Land by Steam; and we do hereby declare that the following is a full, clear, and exact description thereof, reference being had to the accompanying drawings, making part of this specification, in which—

Figure 1:
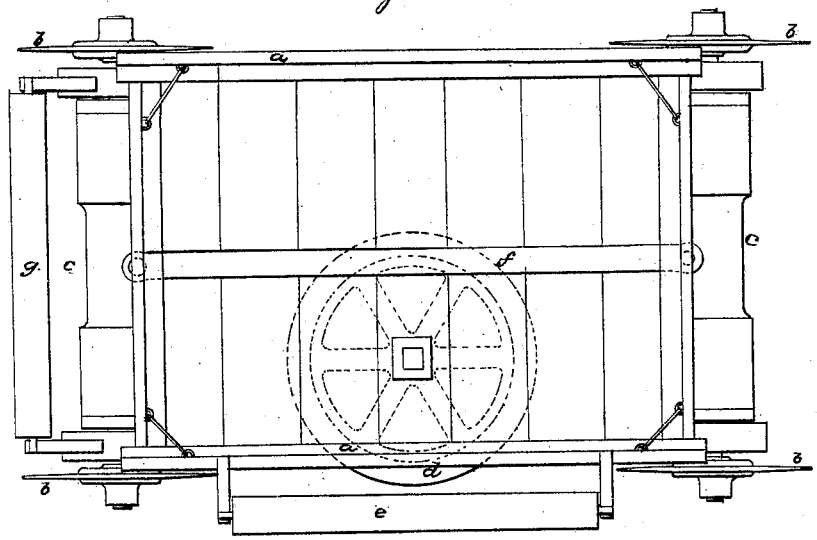
Figure 2:
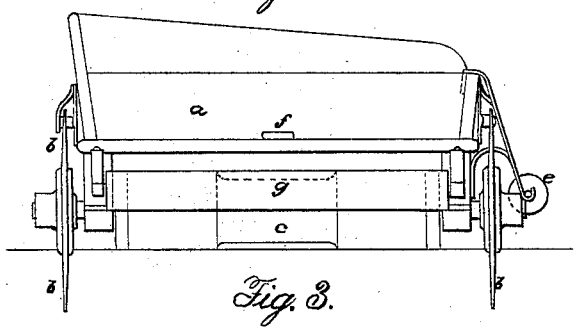
Figure 3:
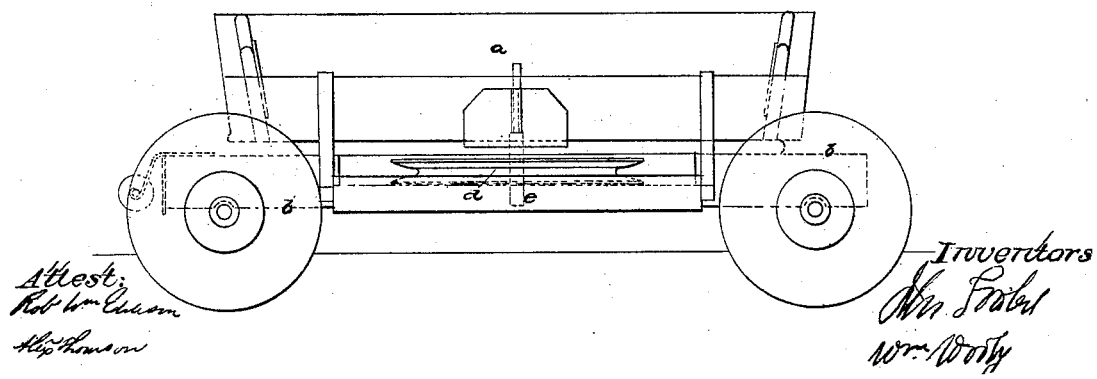

Figure 1 is a plan. Fig. 2 is an end view. Fig. 3 is an elevation.

The same letters indicate like parts in all the figures.

Our said invention relates to that class of machinery for plowing and tilling land by steam in which a locomotive steam-engine moves at given intervals along one edge of the field, and ropes pass from the engine to and around a pulley in a carriage termed an "anchor," which is moved at intervals along the opposite edge of the field, the said ropes from the engine being attached to plows or other tilling-instruments to draw them across the field alternately in opposite directions.

Our said invention consists in mounting the anchoring-carriage on disks or wheels sufficiently thin at the periphery to enable them to cut into the ground, and thus present the required resistance to the strain or pull of the rope drawing the plows or other tilling-instruments.

In the accompanying drawings, *a a a a* is the body of the carriage, having a bottom and four sides, like a cart or truck. In place of being mounted on ordinary wheels, it is mounted on the four disks *b b b b*, which cut into the land and sink therein until the weight of the the carriage is taken by the rollers *c c*, which are mounted on the same axis as the disks. *d* is the pulley, which turns on an axis firmly fixed in the bottom of the carriage. *e* is the roller for guiding the rope. *f* is a bar passing the whole length of the anchoring-carriage and fixed thereto. This bar has an eye at each end, to which a rope or chain may be attached when it is necessary to move the anchoring-carriage. When the anchoring-carriage is in use, it may be loaded with earth or other material to give it sufficient weight.

It will be seen that the anchoring-carriage can be moved forward or backward easily, but cuts into the land a sufficient depth to present the required resistance to the lateral pull of the rope in drawing the plows or other tilling-instruments.

Having thus pointed out the mode of application of our said invention, which we have worked with success, we do not wish to be considered as limiting our claim of invention to such mode of application, as other and equivalent modes may be substituted without deviating from the principle of our said invention.

What we claim as our invention, and desire to secure by Letters Patent, is—

Mounting an anchoring-carriage on disks or wheels sufficiently thin at the periphery to cut or sink into the land, substantially as herein described.

JOHN FOWLER, JR.
WM. WORBY.

Witnesses:
ROBT. WM. EDDISON,
ALEXR. THOMSON.